(12) United States Patent
Allen (10) Patent No.: US 8,532,960 B2
(45) Date of Patent: Sep. 10, 2013

(54) REMOTELY COLLECTING AND MANAGING DIAGNOSTIC INFORMATION

(75) Inventor: Nicholas A. Allen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 12/892,354

(22) Filed: Sep. 28, 2010

(65) Prior Publication Data

US 2012/0078577 A1 Mar. 29, 2012

(51) Int. Cl.
*G06F 11/30* (2006.01)
*G21C 17/00* (2006.01)

(52) U.S. Cl.
USPC .......................................................... 702/183

(58) Field of Classification Search
USPC .......................................................... 702/183
See application file for complete search history.

(56) References Cited

U.S. PATENT DOCUMENTS

| | | | |
|---|---|---|---|
| 5,594,663 A | 1/1997 | Messaros | |
| 6,023,581 A | 2/2000 | Matsuura | |
| 6,697,962 B1 | 2/2004 | McCrory | |
| 6,993,683 B2 | 1/2006 | Bhat | |
| 7,020,598 B1 | 3/2006 | Jacobson | |
| 7,163,144 B1 * | 1/2007 | Trelawney et al. | 235/379 |
| 7,290,048 B1 | 10/2007 | Barnett et al. | |
| 7,308,597 B2 | 12/2007 | Bhat et al. | |
| 7,430,596 B2 | 9/2008 | Jahromi | |
| 7,574,601 B2 | 8/2009 | Jahromi et al. | |
| 7,716,316 B2 | 5/2010 | Nichols | |
| 2004/0073658 A1 | 4/2004 | Oran | |
| 2004/0122906 A1 * | 6/2004 | Goodman et al. | 709/206 |
| 2004/0125403 A1 | 7/2004 | Furst et al. | |
| 2004/0128353 A1 | 7/2004 | Goodman et al. | |
| 2005/0172175 A1 | 8/2005 | Bhat et al. | |
| 2006/0047846 A1 | 3/2006 | Jahromi et al. | |
| 2006/0048220 A1 * | 3/2006 | Jahromi et al. | 726/22 |
| 2006/0069713 A1 | 3/2006 | Wei et al. | |
| 2006/0075045 A1 | 4/2006 | Wei et al. | |
| 2006/0224361 A1 * | 10/2006 | McIntyre et al. | 702/183 |
| 2008/0034367 A1 | 2/2008 | Patrick et al. | |
| 2008/0059625 A1 | 3/2008 | Barnett et al. | |
| 2008/0148099 A1 | 6/2008 | Bhat et al. | |
| 2009/0019319 A1 | 1/2009 | Ooba | |
| 2010/0146489 A1 | 6/2010 | Ortiz | |
| 2010/0153696 A1 * | 6/2010 | Beachem et al. | 713/2 |
| 2011/0072255 A1 * | 3/2011 | Gopalakrishnan et al. | 713/2 |

OTHER PUBLICATIONS

QSI Qualtech Systems Inc., "Enterprise solution for aftermarket service and system-wide health management", Copyright 1993-2010, 2 pages.
MSDN, "Configuring Tracing", Jul. 20, 2010, 6 pages.

(Continued)

*Primary Examiner* — Michael Nghiem
(74) *Attorney, Agent, or Firm* — Workman Nydegger (57) ABSTRACT

The present invention extends to methods, systems, and computer program products for remote collection and management of diagnostic information. Embodiments of the invention facilitate remote configuration, management, and collection of diagnostic results. A remote diagnostic system connects to the local diagnostics of a service or computer system in a non-invasive way to collect diagnostic information. Filter and subscription requests are used to guide the collection and retention of diagnostic information. A diagnostic user connects to the remote diagnostic system to dynamically change the filter and subscription requests as part of a diagnostic process. The collected diagnostic information can then be transmitted to interested system operators using either syndication subscriptions or push subscriptions.

20 Claims, 5 Drawing Sheets

(56) References Cited

OTHER PUBLICATIONS

Office Action dated Aug. 24, 2007 cited in U.S. Appl. No. 10/925,024.
Office Action dated Feb. 6, 2008 cited in U.S. Appl. No. 10/925,024.
Office Action dated Jul. 9, 2008 cited in U.S. Appl. No. 10/925,024.
Notice of Allowance dated Jul. 22, 2008 cited in U.S. Appl. No. 10/925,207.
Notice of Allowance dated Apr. 27, 2009 cited in U.S. Appl. No. 10/925,024.

* cited by examiner

REMOTELY COLLECTING AND MANAGING DIAGNOSTIC INFORMATION

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, distributed systems include a substantial number of client and server service and computer system components. Portions of the distributed system may from time to time experience operational errors leading to the need to perform diagnostic operations, such as, for example, tracing, profiling, and debugging. There is often undesirable overhead associated with diagnostic processes, such as, for example, additional processing, memory, or IO requirements, making it desirable to limit the scope and duration of diagnostic operations. Due to distributed system complexity, tasks required to enable diagnostics on demand, managing the diagnostic configuration of distributed systems, and collecting diagnostic results, it can be difficult and operationally expensive to use diagnostic processes within a distributed system.

BRIEF SUMMARY

The present invention extends to methods, systems, and computer program products for remotely collecting and managing diagnostic information. In some embodiments, diagnostic information is provided from a service host to a remote diagnostic host. The remote diagnostic host is configured to provide a portion of broadcast diagnostic information that is of interest in diagnosing a condition at the service host. A remote diagnostic trace listener is installed as a local diagnostic trace listener within the service host. The remote diagnostic trace listener describes a diagnostic control endpoint that can be used to access and configure the remote diagnostic trance listener.

The remote diagnostic trace listener includes a stub component. The stub component is configured to accept diagnostic information from the service end point and send the diagnostic information to the diagnostic host via the computer network. A connection request is received at the diagnostic control endpoint. The connection request is from an external component outside the service host and outside the diagnostic host. A diagnostic control application is boot strapped to the external component in response to the request.

One or more diagnostic configuration commands are received through the diagnostic control application. The one or more diagnostic commands are for configuring the diagnostic host to collect and provide the portion of the broadcast diagnostic information. A diagnostic subscription endpoint is created to provide the portion of the broadcast diagnostic information to any external components outside of the service host and outside of the diagnostic host. An electronic address for the diagnostic subscription endpoint is returned to the external component.

The portion of broadcast diagnostic information that is of interest in diagnosing a condition at the service host is provided to the external component. The remote diagnostic trace listener records the portion of broadcast diagnostic information to a diagnostic store in accordance with the one or more diagnostic configuration commands. A request for diagnostic information is received at the electronic address for the diagnostic subscription endpoint. The request has a return electronic address for the external component. The portion of broadcast diagnostic information is sent from the diagnostic store to the return electronic address.

In other embodiments, the collection of broadcast diagnostic information is reconfigured during operation of the service host. A remote diagnostic trace listener collects a specified portion of broadcast diagnostic information in accordance with a first diagnostic filter. The specified portion of broadcast information is collected for storage in the diagnostic store while the service host is running.

While the service host continues to run and without restarting the service host, the diagnostic trace listener and diagnostic store are reconfigured to collect a second different specified portion of broadcast diagnostic information that is to be collected for use in diagnosing a condition at the service host. Reconfiguration includes receiving one or more diagnostic configuration commands through the diagnostic control application. The one or more diagnostic configuration commands define the second different specified portion of broadcast diagnostic information that is to be collected.

Reconfiguration includes selecting a second diagnostic filter to collect the second different specified portion of broadcast diagnostic information in accordance with the one or more diagnostic configuration commands. Reconfiguration includes reconfiguring the remote diagnostic trace listener to include the second diagnostic filter. Reconfiguration includes the remote diagnostic trace listener collecting the second different specific portion of broadcast diagnostic information in accordance with the second diagnostic filter. The second different portion of broadcast information is collected for storage in the diagnostic store.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for remotely collecting and managing diagnostic information. In some embodiments, diagnostic information is provided from a service host to a remote diagnostic host. The remote diagnostic host is configured to provide a portion of broadcast diagnostic information that is of interest in diagnosing a condition at the service host. A remote diagnostic trace listener is installed as a local diagnostic trace listener within the service host. The remote diagnostic trace listener describes a diagnostic control endpoint that can be used to access and configure the remote diagnostic trance listener.

The remote diagnostic trace listener includes a stub component. The stub component is configured to accept diagnostic information from the service end point and send the diagnostic information to the diagnostic host via the computer network. A connection request is received at the diagnostic control endpoint. The connection request is from an external component outside the service host and outside the diagnostic host. A diagnostic control application is boot strapped to the external component in response to the request.

One or more diagnostic configuration commands are received through the diagnostic control application. The one or more diagnostic commands are for configuring the diagnostic host to collect and provide the portion of the broadcast diagnostic information. A diagnostic subscription endpoint is created to provide the portion of the broadcast diagnostic information to any external components outside of the service host and outside of the diagnostic host. An electronic address for the diagnostic subscription endpoint is returned to the external component.

The portion of broadcast diagnostic information that is of interest in diagnosing a condition at the service host is provided to the external component. The remote diagnostic trace listener records the portion of broadcast diagnostic information to a diagnostic store in accordance with the one or more diagnostic configuration commands. A request for diagnostic information is received at the electronic address for the diagnostic subscription endpoint. The request has a return electronic address for the external component. The portion of broadcast diagnostic information is sent from the diagnostic store to the return electronic address.

In other embodiments, the collection of broadcast diagnostic information is reconfigured during operation of the service host. A remote diagnostic trace listener collects a specified portion of broadcast diagnostic information in accordance with a first diagnostic filter. The specified portion of broadcast information is collected for storage in the diagnostic store while the service host is running.

While the service host continues to run and without restarting the service host, the diagnostic trace listener and diagnostic store are reconfigured to collect a second different specified portion of broadcast diagnostic information that is to be collected for use in diagnosing a condition at the service host. Reconfiguration includes receiving one or more diagnostic configuration commands through the diagnostic control application. The one or more diagnostic configuration commands define the second different specified portion of broadcast diagnostic information that is to be collected.

Reconfiguration includes selecting a second diagnostic filter to collect the second different specified portion of broadcast diagnostic information in accordance with the one or more diagnostic configuration commands. Reconfiguration includes reconfiguring the remote diagnostic trace listener to include the second diagnostic filter. Reconfiguration includes the remote diagnostic trace listener collecting the second different specific portion of broadcast diagnostic information in accordance with the second diagnostic filter. The second different portion of broadcast information is collected for storage in the diagnostic store.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
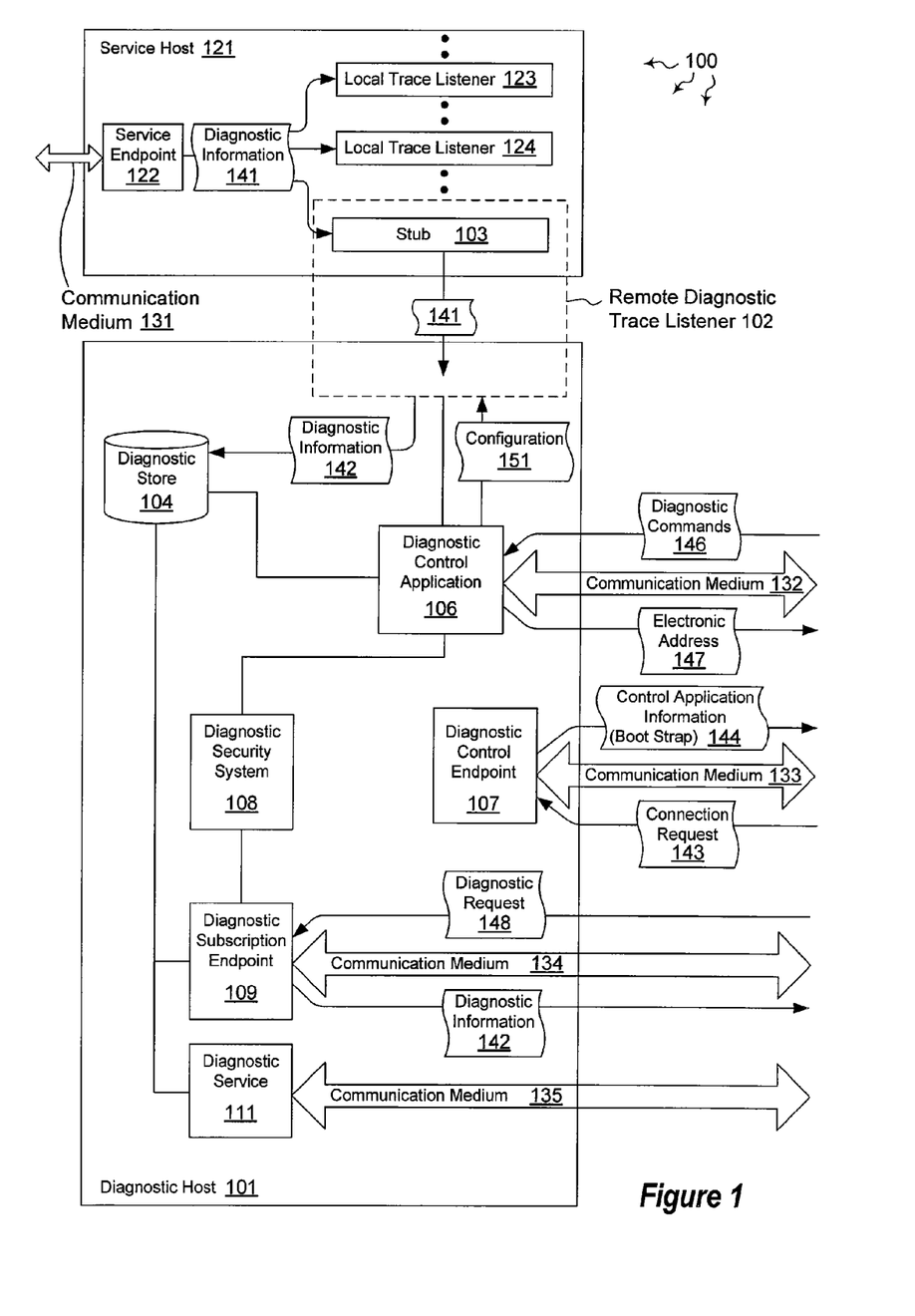
FIG. 1 illustrates an example computer architecture that facilitates providing diagnostic information from a service host to a remote diagnostic host.

FIG. 1 illustrates an example computer architecture 100 that facilitates providing diagnostic information from a service host to a remote diagnostic host. Referring to FIG. 1, computer architecture 100 includes diagnostic host 101 and service host 121. Each of the depicted components is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, a service may be one component within a distributed system. The service executes within a logical service host container that bounds what is considered a part of the service component. The service is configured to periodically collect interesting information and events about its operation as diagnostic traces. The service can broadcast the collected diagnostic traces to any local trace listeners that are configured as part of the definition of the service. However, the number of connected trace listeners is unimportant to the service and there may even be none. The service can expose one or more communication mediums as part of its normal operation to allow external parties to invoke service operations.

As depicted, service host 121 includes service endpoint 122 and trace listeners 123, 124, etc. Service endpoint 122 can periodically broadcast diagnostic information and events about its operation within service host 121. Local trace listeners 123, 124, etc., are configured to listen for and collect diagnostic information and events from service host 121.

Remote diagnostic trace listener 102 spans service host 121 and diagnostic host 101. Remote diagnostic trace listener 102 is installed as a local trace listener from the perspective of service endpoint 122. Thus, remote diagnostic trace listener 102 can listen for and collect diagnostic information and events from service host 121 similar to local trace listeners 123, 124, etc. Due to boundaries between the service host 121 and diagnostic host 101, remote diagnostic trace listener 102 can include stub 103 (a stub component) within the service host 121. Stub 103 is configured to remote diagnostic traces (e.g., in diagnostic information 141) from service endpoint 122 to diagnostic host 101. Use of stub 103 mitigates the likelihood of the diagnostic infrastructure of the service host producing spurious diagnostic traces describing the operation of diagnostic host 101 and remote diagnostic trace listener 102.

Diagnostic host 101 includes diagnostic store 104, diagnostic security system 108, diagnostic control endpoint 107, diagnostic control application 106, diagnostic subscription endpoint 109, and diagnostic service 111. Generally, diagnostic store 104 is configured to store diagnostic traces collected by remote diagnostic trace listener 102. Diagnostic security system 108 authenticates and authorizes diagnostic user operations. Diagnostic control endpoint 107 can be contacted by a diagnostic user to obtain the diagnostic control application for service endpoint 122.

Diagnostic control application 106 allows a remote diagnostic user to configure the operation of the remote diagnostic trace listener 102, diagnostic store 104, and diagnostic authentication system 108. Diagnostic subscription endpoint 109 can be contacted by a diagnostic user to retrieve diagnostic traces from diagnostic store 104. Diagnostic service 111 can be configured to take automated actions on behalf of a diagnostic user based on the contents of diagnostic store 104, such as, for example, when broadcast diagnostic information matches specified criteria.

There can be one or more diagnostic subscription endpoints and diagnostic services based on the configuration performed by the diagnostic user. For example, diagnostic subscription endpoints and diagnostic services may be dynamically created and destroyed through user operation of the diagnostic control application.

The components depicted in computer architecture 100 can interact to provide diagnostic traces to a diagnostic user. For example, diagnostic information can be provided to a diagnostic user that is debugging a distributed system that includes service host 121.

Independently of the actions of a diagnostic user, service endpoint 122 can be identifying interesting information and events and broadcasting the interesting information and events to local trace listeners 123, 124, etc., Among the local trace listeners can be remote diagnostic trace listener 102 that is also recording a portion of broadcast information and events.

The configuration of remote diagnostic trace listener 102 describes the properties of a diagnostic control endpoint 107, such as, for example, the address and connection settings of diagnostic control endpoint 107. Remote diagnostic trace listener 102 opens diagnostic control endpoint 107 to receive diagnostic control requests.

The servicing of the diagnostic control endpoint 107 can be independent of the servicing of the service endpoint 122. For example, communication medium 131 and communication medium 133 can differ. It may be that communication medium 131 is User Datagram Protocol ("UDP") and that communication medium 133 is HyperText Transfer Protocol ("HTTP"). In some embodiments, diagnostic control endpoint 107 is hosted by a lightweight web server that has been stripped of most functionality to increase its security, reliability, and performance. Separation between the service host and diagnostic host may also be beneficial if, for example, a diagnostic user needs to pause and debug service host 121 without wanting to disrupt diagnostic control.

Upon suspecting a problem with the operation of the service endpoint 122, a diagnostic user can contact diagnostic control endpoint 107 and request access to diagnostic information for service 122. In response to the request, diagnostic control endpoint 107 can configure the collection of diagnostic information from service endpoint 122. Configuration can include installing remote diagnostic trace listener 102.

Figure 2:
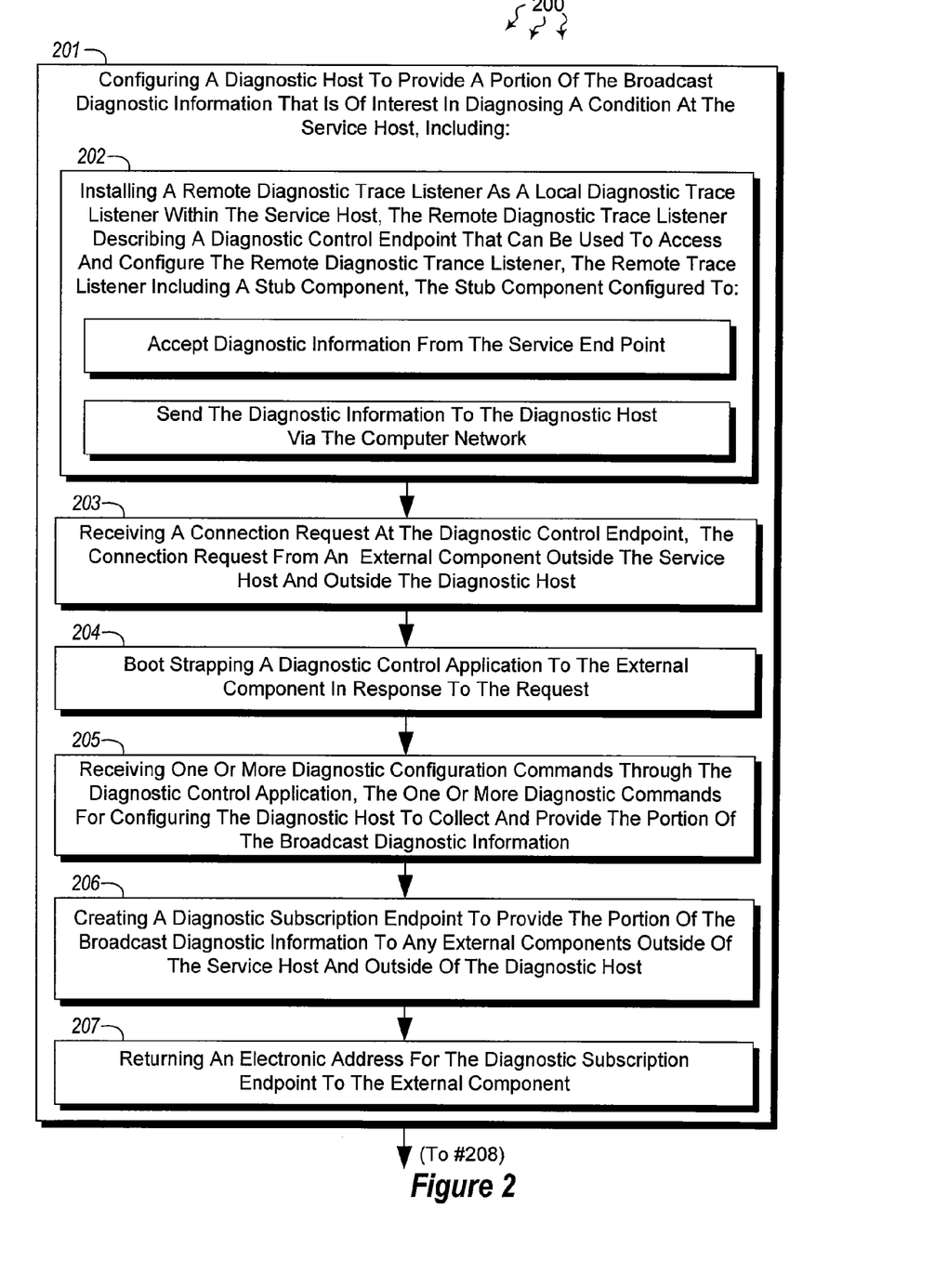
FIG. 2 illustrates a flow chart of an example method for providing diagnostic information from a service host to remote diagnostic host.

FIG. 2 illustrates a flow chart of an example method 200 for providing diagnostic information from a service host to remote diagnostic host. Method 200 will be described with respect to the components and data of computer architecture 100.

Method 200 includes an act of configuring the diagnostic host to provide a portion of the broadcast diagnostic information that is of interest in diagnosing a condition at the service host (act 201). For example, diagnostic control endpoint 107 can be configured to provide diagnostic information 142 (a portion of broadcast diagnostic information 141). Diagnostic information 142 can be of interest to a diagnostic condition (e.g., error or warning) occurring within service host 121.

Configuring the diagnostic host includes an act of installing a remote diagnostic trace listener as a local diagnostic trace listener within the service host, the remote diagnostic trace listener describing a diagnostic control endpoint that can be used to access and configure the remote diagnostic trance listener, the remote trace listener including a stub component, the stub component configured to accept diagnostic information from the service end point and send the diagnostic information to the diagnostic host via the computer network (act 202). For example, diagnostic host 101 can install remote diagnostic trace listener 102 as depicted in computer architecture 100. Remote diagnostic trace listener 102 describes diagnostic control endpoint 107. Remote diagnostic trace listener 102 includes stub 103. Stub 103 is configured to accept diagnostic information from the service end point 122 and send the diagnostic information to diagnostic host 101 via a computer network Configuring the diagnostic host includes an act of receiving a connection request at the diagnostic control endpoint, the connection request from an external component outside the service host and outside the diagnostic host (act 203). For example, diagnostic control endpoint 107 can receive connection request 143 from a diagnostic user via communication medium 133. The connection request can originate from a computer system or communication component being used by the diagnostic user.

Configuring the diagnostic host include an act of boot strapping a diagnostic control application to the external component in response to the request (act 204). For example, diagnostic control endpoint 107 can send control application information 144 back to the diagnostic user via communication medium 133. Control application information 144 can be information for boot strapping diagnostic control application 106. For example, control application information 144 can be actual application data or information for accessing actual application data. In some embodiments, diagnostic control application 106 is a downloaded separate application that the diagnostic user installs and runs. Alternately, diagnostic control application 106 can be a Web browser application, for example, using Java applets, Microsoft® Silverlight® controls, or HyperText Markup Language 5 ("HTML 5"), that is downloaded to be run in a Web browser of the diagnostic user. Diagnostic control application 106 can be preconfigured to point back to diagnostic host 101 (the diagnostic host from which it was generated).

Configuring the diagnostic host include an act of receiving one or more diagnostic configuration commands through the diagnostic control application, the one or more diagnostic commands for configuring the diagnostic host to collect and provide the portion of the broadcast diagnostic information (act 205). For example, diagnostic control application 106 can receive diagnostic commands 146 from a diagnostic user via communication medium 132. Diagnostic commands 146 are for configuring diagnostic host 101 to collect and provide diagnostic information 142. Diagnostic control application 106 can derive configuration 151 for remote diagnostic trace listener 102 from diagnostic commands 146. Diagnostic control application 106 can configure remote diagnostic trace listener 102 in accordance with configuration 151.

In general, diagnostic control application 106 enables the diagnostic user to configure and reconfigure remote diagnostic trace listener 102 and diagnostic store 104. Configuration and reconfiguration of diagnostic trace listener 102 and diagnostic store 104 can include one or more of: (1) changing filters to record specific categories of diagnostic traces, such as, for example, startup events or communication events, (2) changing filters to record specific severities of diagnostic traces, such as, for example, error events or warning events, (3) changing filters to collect specific information, such as, for example, the contents of messages, (4) creating subscriptions to retrieve at a later time recorded traces that match a set of criteria, (5) enabling services to take action when recorded traces match a set of criteria, such as, for example, a service to send a text message when an error trace is recorded, (6) setting retention policies on the diagnostic store such as, for example, the maximum quantity or length of time to keep diagnostic traces, and (7) changing user permissions to perform other diagnostic operations.

Changing filters can be implemented by reconfiguring the service endpoint 122 to produce a different set of interesting information and events. Alternately, changing filters may be implemented by reconfiguring remote diagnostic trace listener 102 to alter which broadcasted debugging traces are recorded. Creating subscriptions and setting retention policies can be implemented by reconfiguring the diagnostic store.

Diagnostic security system 108 can control permission to perform any of these operations or to view information about service host 121 and diagnostic configuration by authenticating and authorizing a requesting diagnostic user.

In a more particular example, suppose a diagnostic user wants to be notified when an error event occurs in a Calculator subcomponent of a service component. The diagnostic user, through diagnostic control application 106, can change the filters to record diagnostic traces of error severity only. The diagnostic user also may create a subscription using a filter that matches the Calculator subcomponent. For example, diagnostic traces regarding the Calculator subcomponent may be identifiable by defining an eXstensible Markup Language Path Language ("XML Path Language" or "XPath") expression "//Source[@component='Calculator']" that searches for a Calculator component attribute in a Source element within each recorded diagnostic trace.

Alternately, the diagnostic user may continue to collect diagnostic traces of many severities and add a filter to match diagnostic traces of error severity by adding that criteria to the criteria matching the subcomponent type.

Configuring the diagnostic host includes an act of creating a diagnostic subscription endpoint to provide the portion of the broadcast diagnostic information to any external components outside of the service host and outside of the diagnostic host (act 206). For example, responsive to diagnostic commands 146, remote diagnostic trace listener 102 can start diagnostic subscription endpoint 109. Remote diagnostic trace listener 102 can assign electronic address 147 (a unique address) to diagnostic subscription endpoint 109. The unique address can be Uniform Resource Locator ("URL"). For example, referring back to the Calculator subcomponent example, diagnostic subscription endpoint 109 can be assigned the address:

--- http://www.example.com:9000/?filter=%2F%2FSource%5B%40component%3D%E2%80%99Calculator%E2%80%99%5D&type=rss

---

Configuring the diagnostic host includes an act of returning an electronic address for the diagnostic subscription endpoint to the external component (act 207). For example, diagnostic control application 106 can return electronic address 147 to the diagnostic user via communication medium 132.

Method 200 includes an act of providing the portion of broadcast diagnostic information that is of interest in diagnosing a condition at the service host to the external component (act 208). For example, diagnostic subscription endpoint 109 can provide diagnostic information 142 to the diagnostic user.

Providing the portion of broadcast diagnostic information that is of interest includes an act of the remote diagnostic trace listener recording the portion of broadcast diagnostic information to a diagnostic store in accordance with the one or more diagnostic configuration commands (act 209). For example, remote diagnostic trace listener 102 can record diagnostic information 142 to diagnostic store 104 in accordance with diagnostic commands 146. Remote diagnostic listener can receive diagnostic information 141 broadcast from service endpoint 122. One or more filters within remote diagnostic listener 102 can filter out diagnostic information 142 (a portion of diagnostic information of interest) from diagnostic information 141.

Providing the portion of broadcast diagnostic information that is of interest includes an act of receiving a request for diagnostic information at the electronic address for the diagnostic subscription endpoint, the request having a return electronic address for the external component (act 210). For example, diagnostic subscription endpoint 109 can receive diagnostic request 148 from a diagnostic user via communication medium 134. Request 148 can be directed to electronic address 147 and can include a return address to diagnostic user.

Providing the portion of broadcast diagnostic information that is of interest includes an act of sending the portion of broadcast diagnostic information from the diagnostic store to the return electronic address (act 211). For example, diagnostic subscription endpoint 109 can provide diagnostic information 142 back to the return address included in diagnostic request 148 via communication medium 134.

Thus, by navigating to an assigned address a diagnostic user can retrieve diagnostic information that has been collected. For example, subsequent to configuration or reconfiguring using the diagnostic control application 106, a diagnostic user may input the assigned address into an Really Simple Syndication ("RSS") reader application. The RSS reader application can periodically poll diagnostic subscription endpoint 109 to retrieve the latest diagnostic events and present them to a diagnostic user. Once the user has sufficient information to address a condition with (e.g., debug) a distributed system including service host 121, the diagnostic user may again access the diagnostic control application 106 to disable recording diagnostic traces and delete the subscription.

Alternately, a subscription can be automatically deleted after a period of time as part of the retention policy of the remote diagnostic trace listener.

In some embodiments, diagnostic host 101 listens for any requests coming to a specific base address. When a diagnostic user accesses an address that contains the base address as a prefix, diagnostic host 101 uses the resource access attempt to create a subscription without further input by the diagnostic user.

For example, referring again to the Calculator subcomponent example, the string "% 2F % 2FSource % 5B % 40component % 3D % E2% 80% 99Calculator % E2% 80% 99% 5D" can be a URL encoded version of the previously described XPath expression "//Source [@component='Calculator']". A diagnostic user can navigate to the address in a Web browser without having previously created a subscription. Navigating to the address causes diagnostic host 101 to create a subscription with the filter defined by the XPath expression, similar to reconfiguration through diagnostic control application 106. Diagnostic security system 108 can perform authentication and authorization, such as, for example, by issuing an HTTP authentication request when accessing the resource address.

In this way for example, a diagnostic user can bookmark a location that corresponds to an interesting diagnostic configuration and restore the diagnostic configuration at a later time for use with this or another instance of the distributed system.

Embodiments of the invention include communicating with service host 121 and the various components of diagnostic host 101 using different communication mediums. For example, one or more communication mediums 131, 132, 133, 134, and 135 can be different from another.

Figure 3:
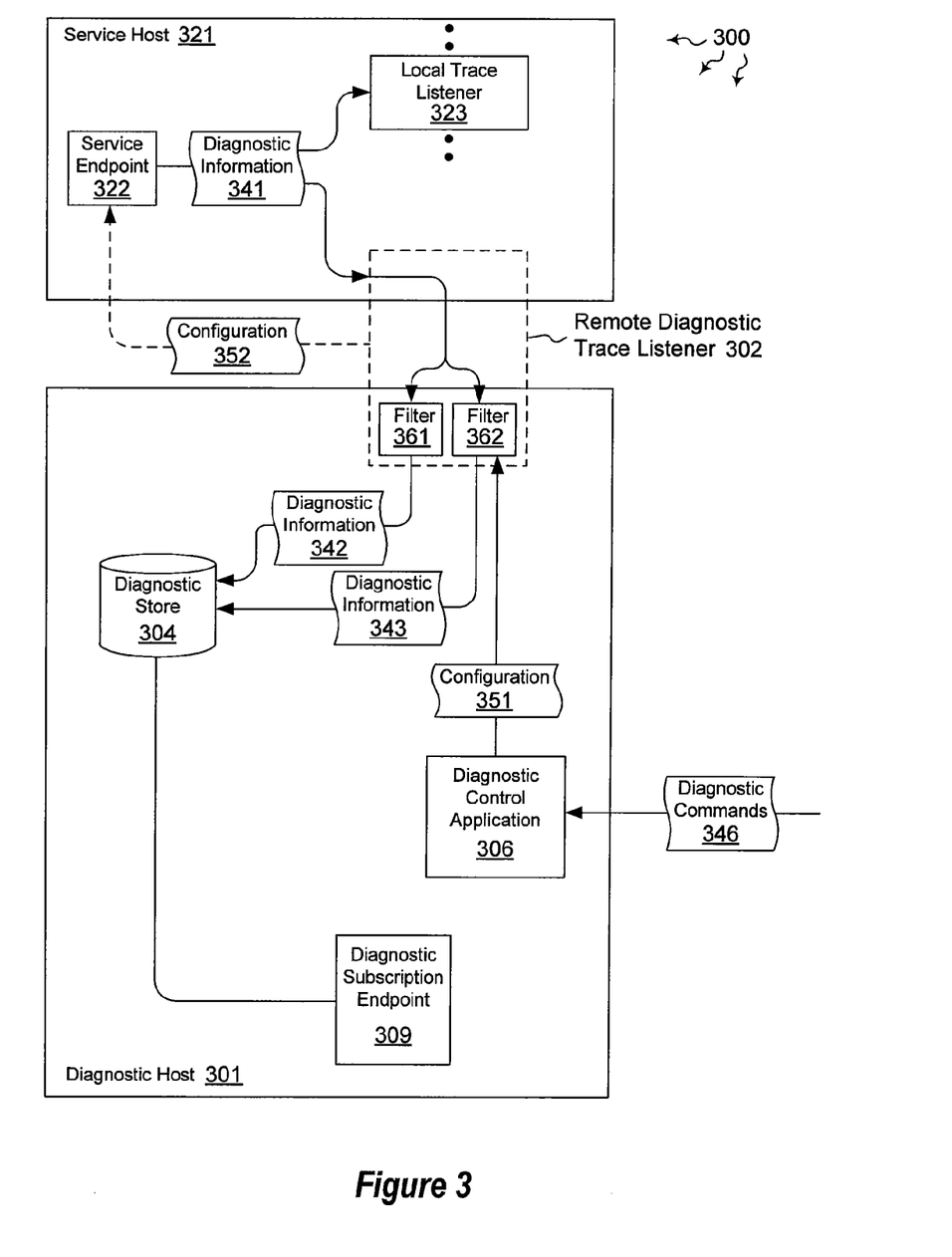
FIG. 3 illustrates an example computer architecture that facilitates reconfiguring the collection of broadcast diagnostic information during operation of a service host.

In other embodiments of the invention, the collection of diagnostic information from a service host is re-configured during operation of the service host. FIG. 3 illustrates an example computer architecture 300 that facilitates reconfiguring the collection of broadcast diagnostic information during operation of a service host. Referring to FIG. 3, computer architecture 300 includes diagnostic host 301 and service host 321. Each of the depicted components is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Within computer architecture 300, service endpoint 322 can be broadcasting diagnostic information to local trace listeners, including local trace listener 323, and to remote diagnostic trace listener 302.

Figure 4:
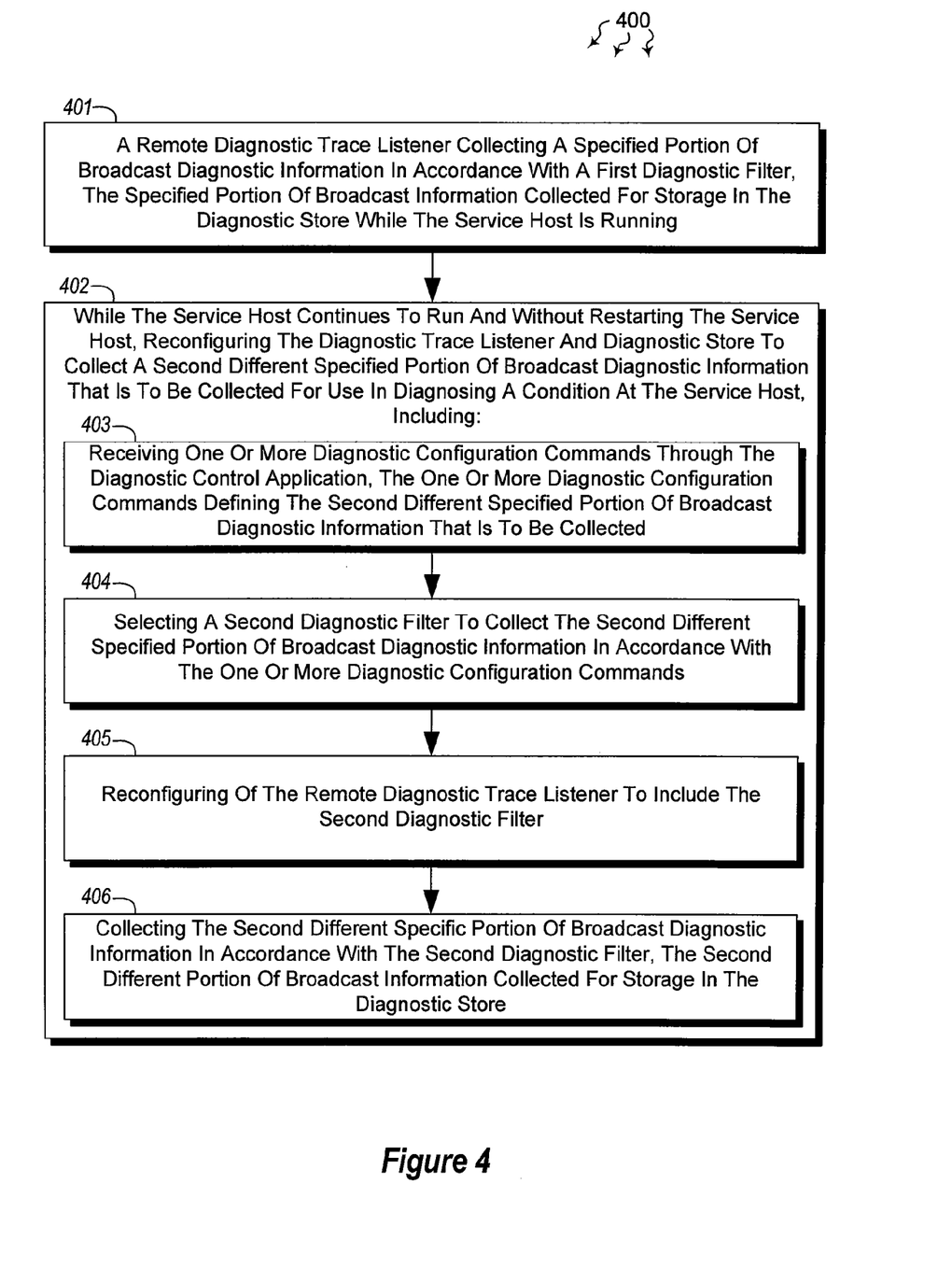
FIG. 4 illustrates a flow chart of an example method for reconfiguring the collection of broadcast diagnostic information during operation of a service host.

FIG. 4 illustrates a flow chart of an example method 400 for reconfiguring the collection of broadcast diagnostic information during operation of a service host. Method 400 will be described with respect to the components and data of computer architecture 300.

Method 400 includes an act of the remote diagnostic trace listener collecting a specified portion of broadcast diagnostic information in accordance with a first diagnostic filter, the specified portion of broadcast information collected for storage in the diagnostic store while the service host is running (act 401). For example, remote diagnostic trace listener 302 can collect diagnostic information 342 in accordance with filter 361. That is, filter 361 can filter diagnostic information 342 from diagnostic information 341. Diagnostic information 342 can be collected for storage in diagnostic store 304 while service host 321 is running.

Method 400 includes while service host continues to run and without restarting the service host, an act of reconfiguring the diagnostic trace listener and diagnostic store to collect a second different specified portion of broadcast diagnostic information that is to be collected for use in diagnosing a condition at the service host (act 402). For example, while service host 321 continues to run and without restarting service host 321, remote diagnostic trace listener 302 and diagnostic store 304 can be reconfigured to collect diagnostic information 343. Diagnostic information 343 can be collected for use in diagnostic a condition at service host 321. A retention policy can be set on diagnostic store 304 for diagnostic information 343.

Reconfiguring the diagnostic trace listener and diagnostic store includes an act of receiving one or more diagnostic configuration commands through the diagnostic control application, the one or more diagnostic configuration commands defining the second different specified portion of broadcast diagnostic information that is to be collected (act 403). For example, diagnostic control application 306 can receive diagnostic commands 346. Diagnostic commands 346 can define configuration 351 for remote diagnostic trace listener 302. Configuration 351 can include an indication that diagnostic information 343 is to be collected from diagnostic information 341

Reconfiguring the diagnostic trace listener and diagnostic store includes an act of selecting a second diagnostic filter to collect the second different specified portion of broadcast diagnostic information in accordance with the one or more diagnostic configuration commands (act 404). For example, configuration 351 can indicate that filter 362 is to be selected to collect diagnostic information 343.

Reconfiguring the diagnostic trace listener and diagnostic store includes an act of reconfiguring of the remote diagnostic trace listener to include the second diagnostic filter (act 405). For example, configuration 351 can be implemented at remote diagnostic trace listener 302. Implementing configuration 351 can include reconfiguring remote diagnostic trace listener 302 to include filter 362 (and either keep or remove filter 361). Alternately, configuration 352 can be issued to service endpoint 322 to cause service endpoint 322 to broadcast diagnostic information 343 directly.

Reconfiguring the diagnostic trace listener and diagnostic store includes an act of the remote diagnostic trace listener collecting the second different specific portion of broadcast diagnostic information in accordance with the second diagnostic filter, the second different portion of broadcast information collected for storage in the diagnostic store (act 406). For example, diagnostic information 343 can be collected in accordance with filter 362. Diagnostic information 343 can be collected for storage in diagnostic store 304.

A remote diagnostic user can connect to diagnostic subscription endpoint 309 to access diagnostic information 343.

Filter 361 can remain active or be removed as part of reconfiguring the collection and storage of diagnostic information from service endpoint 322.

Thus, configuration and reconfiguration of diagnostic trace listener 302 and diagnostic store 304 can include one or more of: (1) changing filters to record specific categories of diagnostic traces, such as, for example, startup events or communication events, (2) changing filters to record specific severities of diagnostic traces, such as, for example, error events or warning events, (3) changing filters to collect specific information, such as, for example, the contents of messages, (4) creating subscriptions to retrieve at a later time recorded traces that match a set of criteria, (5) enabling services to take action when recorded traces match a set of criteria, such as, for example, a service to send a text message when an error trace is recorded, (6) setting retention policies on the diagnostic store such as, for example, the maximum quantity or length of time to keep diagnostic traces, and (7) changing user permissions to perform other diagnostic operations, while service host 321 is running and without restarting service host 321.

Accordingly, embodiments of the invention facilitate remote configuration, management, and collection of diagnostic results. A remote diagnostic system connects to the local diagnostics of the service or computer system in a non-invasive way to collect diagnostic information. Filter and subscription requests are used to guide the collection and retention of diagnostic information. A diagnostic user connects to the remote diagnostic system to dynamically change the filter and subscription requests as part of a diagnostic process. The collected diagnostic information can then be transmitted to interested system operators using either syndication subscriptions or push subscriptions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer system including a diagnostic host and a diagnostic store, the diagnostic host connected to a service host via a computer network, the diagnostic store for storing diagnostic information for the diagnostic host, the service host having a service endpoint configurable to broadcast diagnostic information for the service host, the service host configured to interoperate with local diagnostic trace listeners that provide portions of the broadcast diagnostic information to other components for use in diagnosing conditions at the service host, a method implemented by the computer system for providing diagnostic information from the service host to the diagnostic host, the method comprising:
- an act of configuring the diagnostic host to provide a portion of the portions of the broadcast diagnostic information that is of interest in diagnosing a condition at the service host, including:
  - an act of installing a remote diagnostic trace listener as a local diagnostic trace listener within the service host, the remote diagnostic trace listener describing a diagnostic control endpoint that can be used to access and configure the remote diagnostic trance listener, the remote trace listener including a stub component, the stub component configured to:
    - accept diagnostic information from the service endpoint; and
    - send the diagnostic information to the diagnostic host via the computer network;
  - an act of receiving a connection request at the diagnostic control endpoint, the connection request from an external component outside the service host and outside the diagnostic host;
  - an act of boot strapping a diagnostic control application to the external component in response to the request;
  - an act of receiving one or more diagnostic configuration commands through the diagnostic control application, the one or more diagnostic commands for configuring the diagnostic host to collect and provide the portion of the portions of the broadcast diagnostic information;
  - an act of creating a diagnostic subscription endpoint to provide the portion of the portions of the broadcast diagnostic information to any external components outside of the service host and outside of the diagnostic host; and
  - an act of returning an electronic address for the diagnostic subscription endpoint to the external component; and
- an act of providing the portion of the portions of the broadcast diagnostic information that is of interest in diagnosing a condition at the service host to the external component, including:
  - an act of the remote diagnostic trace listener recording the portion of the portions of the broadcast diagnostic information to a diagnostic store in accordance with the one or more diagnostic configuration commands;
  - an act of receiving a request for diagnostic information at the electronic address for the diagnostic subscription endpoint, the request having a return electronic address for the external component; and
  - an act of sending the portion of the portions of the broadcast diagnostic information from the diagnostic store to the return electronic address for the external component.

2. The method as recited in claim 1, wherein the act of installing a remote diagnostic trace listener as a local diagnostic trace listener within the service host comprises an act of installing the remote diagnostic trace listener with a filter configured to select the portion of the portions of the broadcast diagnostic information that is broadcast by the service host.

3. The method as recited in claim 2, wherein the act of installing the remote diagnostic trace listener with a filter comprises an act of installing a filter to filter specific categories of diagnostic traces from the broadcast diagnostic information.

4. The method as recited in claim 2, wherein the act of installing the remote diagnostic trace listener with a filter comprises an act of installing a filter to filter specific severities of diagnostic traces from the broadcast diagnostic information.

5. The method as recited in claim 2, wherein the act of installing the remote diagnostic trace listener with a filter comprises an act of installing a filter represented by an Extensible Markup Language expression.

6. The method as recite in claim 1, further comprising:
- an act of configuring a diagnostic service to take an automated action when the portion of broadcast diagnostic information matches specified criteria;
- an act of detecting that the portion of the portions of the broadcast diagnostic information matches specified criteria; and
- an act of automatically performing the automated action in response to detecting the match.

7. The method as recited in claim 1, wherein the act of boot strapping a diagnostic control application to the external component comprises an act of downloading an installable application to a computer system of a diagnostic user.

8. The method as recited in claim 1, wherein the act of boot strapping a diagnostic control application to the external component comprises an act of downloading a web application to be run in a web browser of a diagnostic user.

9. The method as recited in claim 1, wherein the service host communicates on a first communication medium and the diagnostic host communicates on a second different communication medium.

10. The method as recited in claim 1, further comprising:
- an act of a diagnostic security system authenticating and authorizing configuration of the diagnostic host and providing the portion of the portions of the broadcast diagnostic information.

11. A computer system comprising:
- one or more processors;
- a diagnostic host, the diagnostic host being connected to a service host via a computer network, wherein the service host includes a service endpoint configurable to broadcast diagnostic information for the service host, and wherein the service host is configured to interoperate with local diagnostic trace listeners that provide portions of the broadcast diagnostic information to other components for use in diagnosing conditions at the service host;
- a diagnostic store that stores diagnostic information for the diagnostic host; and one or more storage device having stored computer-executable instructions which, when executed by the one or more processors, implement a method for providing diagnostic information from the service host to the diagnostic host, the method comprising:
  - an act of configuring the diagnostic host to provide a portion of the portions of the broadcast diagnostic information that is of interest in diagnosing a condition at the service host, including:
    - an act of installing a remote diagnostic trace listener as a local diagnostic trace listener within the service host, the remote diagnostic trace listener describing a diagnostic control endpoint that can be used to access and configure the remote diagnostic trance listener, the remote trace listener including a stub component, the stub component configured to:
      - accept diagnostic information from the service endpoint; and
      - send the diagnostic information to the diagnostic host via the computer network;
    - an act of receiving a connection request at the diagnostic control endpoint, the connection request from an external component outside the service host and outside the diagnostic host;

an act of boot strapping a diagnostic control application to the external component in response to the request;

an act of receiving one or more diagnostic configuration commands through the diagnostic control application, the one or more diagnostic commands for configuring the diagnostic host to collect and provide the portion of the portions of the broadcast diagnostic information;

an act of creating a diagnostic subscription endpoint to provide the portion of the portions of the broadcast diagnostic information to any external components outside of the service host and outside of the diagnostic host; and an act of returning an electronic address for the diagnostic subscription endpoint to the external component; and an act of providing the portion of the portions of the broadcast diagnostic information that is of interest in diagnosing a condition at the service host to the external component, including:

an act of the remote diagnostic trace listener recording the portion of the portions of the broadcast diagnostic information to a diagnostic store in accordance with the one or more diagnostic configuration commands;

an act of receiving a request for diagnostic information at the electronic address for the diagnostic subscription endpoint, the request having a return electronic address for the external component; and an act of sending the portion of the portions of the broadcast diagnostic information from the diagnostic store to the return electronic address for the external component.

12. The computer system as recited in claim 11, wherein the act of installing a remote diagnostic trace listener as a local diagnostic trace listener within the service host comprises an act of installing the remote diagnostic trace listener with a filter configured to select the portion of the portions of the broadcast diagnostic information that is broadcast by the service host.

13. The computer system as recited in claim 12, wherein the act of installing the remote diagnostic trace listener with a filter comprises an act of installing a filter to filter specific categories of diagnostic traces from the broadcast diagnostic information.

14. The computer system as recited in claim 12, wherein the act of installing the remote diagnostic trace listener with a filter comprises an act of installing a filter to filter specific severities of diagnostic traces from the broadcast diagnostic information.

15. The computer system as recited in claim 12, wherein the act of installing the remote diagnostic trace listener with a filter comprises an act of installing a filter represented by an Extensible Markup Language expression.

16. The computer system as recite in claim 11, further comprising:

an act of configuring a diagnostic service to take an automated action when the portion of broadcast diagnostic information matches specified criteria;

an act of detecting that the portion of the portions of the broadcast diagnostic information matches specified criteria; and an act of automatically performing the automated action in response to detecting the match.

17. The computer system as recited in claim 11, wherein the act of boot strapping a diagnostic control application to the external component comprises an act of downloading an installable application to a computer system of a diagnostic user.

18. The computer system as recited in claim 11, wherein the act of boot strapping a diagnostic control application to the external component comprises an act of downloading a web application to be run in a web browser of a diagnostic user.

19. The computer system as recited in claim 11, wherein the service host communicates on a first communication medium and the diagnostic host communicates on a second different communication medium.

20. The computer system as recited in claim 11, wherein the method further comprises:

an act of a diagnostic security system authenticating and authorizing configuration of the diagnostic host and providing the portion of the portions of the broadcast diagnostic information.

* * * * *